United States Patent Office 2,751,752
Patented June 26, 1956

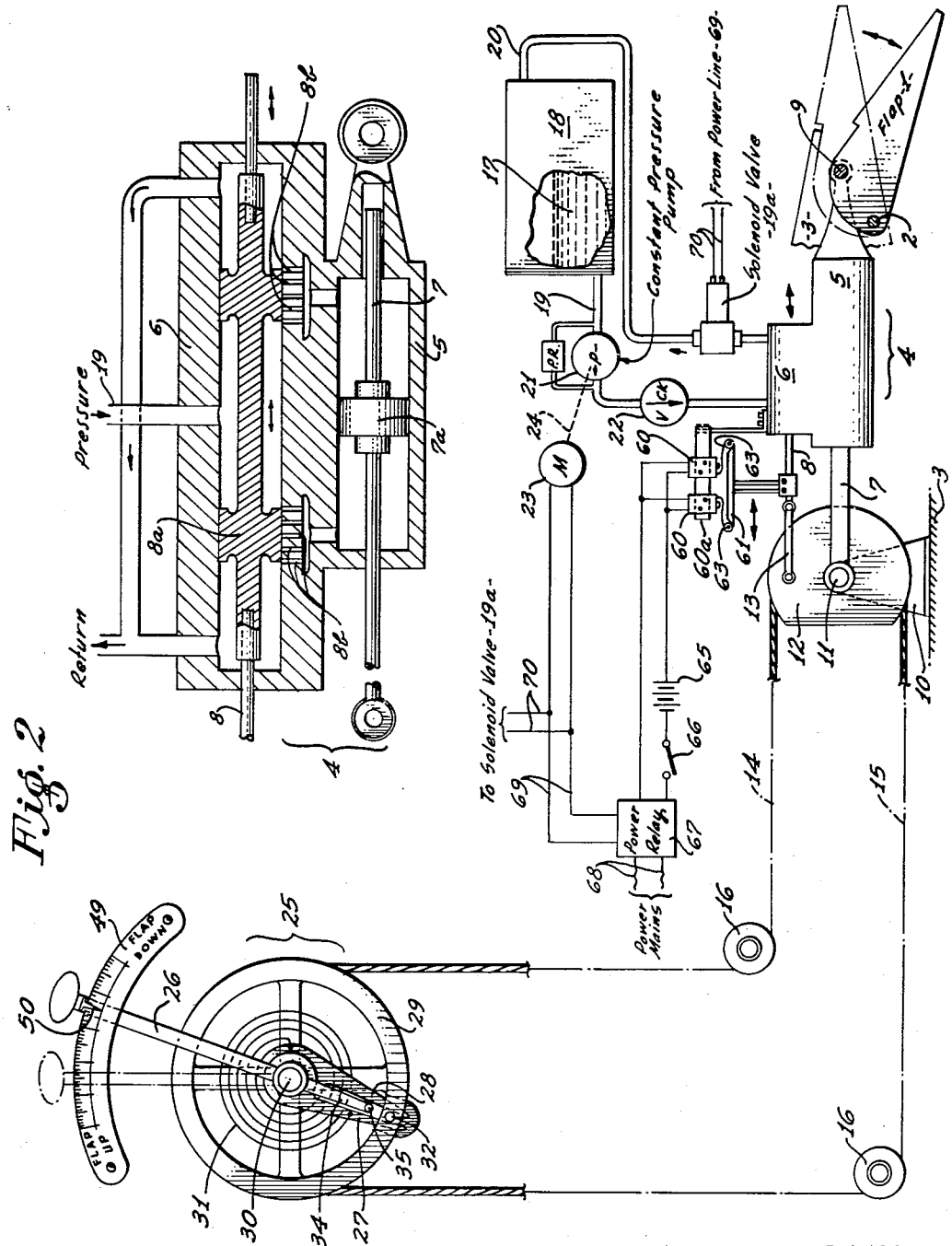

2,751,752

ELECTRIC-HYDRAULIC FLAP CONTROL SYSTEM

Herbert E. Metcalf, Los Angeles, Calif., assignor to Northrop Aircraft, Inc., Hawthorne, Calif., a corporation of California Application April 17, 1953, Serial No. 349,508

6 Claims. (Cl. 60—52)

This invention relates to a hydraulic control system of general utility and more particularly to a hydraulic system useful for actuating control surfaces of airplanes.

In certain types of aircraft it has been found desirable to provide certain surfaces that are only occasionally used, such as landing flaps and dive brakes, with exact hydraulic positioning control. Hydraulic control requires the use of fluid under pressure, and when the control surface is not often operated, it is neither necessary nor desirable to consume power to maintain a constant supply of hydraulic fluid under pressure in the airplane, particularly when no other use for such fluid is present.

It is an object of the present invention to provide means for actuating surfaces such as the landing flaps or dive brakes of an airplane in which the source of power for said means functions only during periods in which the surfaces are being moved.

Another object is to provide means whereby the position a power actuated flap will assume is exactly predetermined by the prior setting of the pilot's landing flap control unit.

Briefly the present invention in one form as practiced includes the use, in an airplane control system, of a hydraulic cylinder-piston type motor connected to move a control surface of an airplane by movement of a fluid control valve as controlled by the pilot of the airplane. A follow-up system is provided so that the motor will move the surface to a position exactly in accord with the position to which the valve has been moved.

As the valve movement is started, a power means is automatically energized to supply hydraulic fluid under pressure to the hydraulic motor, the power means then being automatically de-energized as surface movement ceases. In this manner the surface is exactly positioned and power is consumed only while the surface is being moved.

The invention will be more clearly understood by detailed reference to the accompanying drawings in which:

Figure 1 is a diagrammatic view of an airplane landing flap control system embodying the present invention.

Figure 2 is a diagrammatic sectional view of a hydraulic motor and control valve suitable for use in the present invention.

Referring first to Figure 1, a landing flap 1 is mounted for rotary movement about an axis 2, the flap 1 being supported by suitable bearings (not shown) attached to an airplane wing 3. The landing flap 1 is moved by a hydraulic motor or actuator 4 preferably of the neutral leakage type which is disclosed for example in U. S. Patent No. 2,612,872 (Strayer).

As diagrammatically shown in Figure 2, a hydraulic motor or actuator 4 comprises a hydraulic cylinder 5 and servo valve 6, the cylinder being provided with a conventional piston rod 7 and piston 7a, and the valve being provided with a valve stem 8 and spool 8a for directing fluid to the desired end of the hydraulic cylinder through bores 8b as they are uncovered by spool movement. Spool movement in this type of valve is on the order of only two-tenths of an inch in either direction from neutral for full power application. The closed end of cylinder 5 is attached to the nose portion of the flap 1 by means of a pin 9 positioned in spaced relation with respect to axis 2. The end of piston rod 7, extending from the hydraulic cylinder 5, is attached to a bearing support 10 by means of a pin 11, the bearing support 10 being secured, as by welding, to a structural element of the wing 3. Also rotatably mounted on pin 11 is a cable quadrant 12 to which the valve stem 8 is attached through a connecting link 13; the attaching point of the link being located radially outward of pin 11. A pair of flexible cables 14 and 15 extend from the quadrant 12 to a cable pulley 29; the construction and function thereof being described later. The cables 14 and 15 are secured to the quadrant 12 and pulley 29 in a conventional manner with the cables being positioned by means of a pair of idler pulleys 16.

Fluid 17 for the hydraulic actuator is supplied to motor 4 from a reservoir 18 through a pressure conduit 19 and returned to the reservoir via return conduit 20. A hydraulic constant pressure pump 21 and check valve 22 are positioned in pressure conduit 19. The check valve, being located adjacent servo valve 6, permits fluid flow to the valve 6 but checks fluid from flowing in a reverse direction. An electrically operated solenoid valve 19a, normally closed, is positioned in conduit 20. An electric motor 23, so connected that it is energized and de-energized in accordance with the operation of a landing flap control unit 25 in a manner to be presently described, actuates hydraulic pump 21 by means of a conventional drive as indicated by broken line 24.

The pilot's landing flap control unit 25 is mounted in the cockpit of the airplane (not shown) with which it is associated, the same being further located so that it is readily accessible by the pilot. Unit 25 comprises a control handle 26, an outer drive lever 27, an inner drive lever 28 and the cable pulley 29, all rotatably and independently mounted side by side on a mounting pin 30. A torsion spring 31 is also centrally positioned about mounting pin 30 between the inner drive lever 28 and the cable pulley 29. The inner end of spring 31 is attached to the inner drive lever 28 while its outer end is attached to the outer drive lever 27 near its outer end, the spring 31 being preloaded by a predetermined amount of wind-up to tend to force the drive levers 27 and 28 toward each other.

In the rest position of the flap control unit 25, the outer ends of both drive levers 27 and 28 are held apart against the rotative force of the preloaded spring 31 by a pulley pin 32 which is fixed to pulley 29. Since both drive levers 27 and 28 are bearing against pulley pin 32, one on each side thereof, no resultant force is normally exerted on the cable pulley 29 to rotate it about the mounting pin 30.

A lower extension 34 of the control handle 26 is provided with a pin 35 which also extends between the drive lever ends, the pin 35 functions to rotate one of the drive levers 27 or 28 depending upon which direction the control handle 26 is moved. Control handle 26 is mounted so that it cannot be moved by the force exerted by spring 31.

Thus if either the outer or inner lever 27 or 28 respectively is displaced in the direction away from the pulley arm pin 32 by operation of handle 26, the power stored in spring 31 acting on the other lever and pin 32 rotates the cable pulley 29 in the same direction as the initial drive lever was displaced. As the cable pulley 29 is free to turn on pin 30 it will reach a new neutral or rest position when the pulley arm pin 32 again contacts the end of the drive lever which was displaced.

An accurate scale element 49, the same being non-movable, is positioned adjacent the control handle 26. The scale element 49, preferably graduated in degrees, cooperates with an index element 50 located on the control handle 26 to indicate the relative position of the control handle with respect to the scale 49. The position of index element 50 relative to the scale 49 also indicates the position which the flap 1 will automatically assume.

The energization of motor 23 is controlled by a pair of spaced switches 60 mounted on a bracket 60a extended from valve 6, these switches 60 being positioned parallel to and at one side of valve stem 8. Mounted on valve stem 8 to move longitudinally therewith is a linear cam 61, positioned between operating arms 63 of the two switches 60 so that when the valve spool 8a is in the neutral position both switches 60 are open circuited and so that when relative movement between valve stem 8 and the housing of actuator 4 occurs, one or the other of the switches 60 is closed.

Switches 60 are connected in parallel electrically and then through a relay battery 65, a switch 66 to a power relay 67. Power relay 67 controls power from power mains 68 to motor 23 through power line 69. Power line 69 is also connected to solenoid valve 19a through solenoid line 70.

In operation, the pilot moves the handle 26 to change the position of flap 1. Rotation of cable pulley 29 occurs with this movement until the resultant movement of the valve stem 8 causes spool 8a to bottom in valve 6. During this initial movement one of the switches 60 is closed, thereby starting motor 23 which drives pump 21. The hydraulic motor 4 then acts to move the surface 1 to cause the valve 6 and cylinder 5 to follow the valve stem 8. However, when handle 26 is moved past the point where the spool 8a has bottomed, the cable pulley 29 cannot rotate any further and spring 31 is accordingly wound up. The handle 26 is frictionally mounted so that it can readily be moved by the pilot, but resists being moved by the maximum force that can be exerted by spring 31. Then, as the valve 6 moves, the spring 31 will rotate the cable pulley 29 to keep the valve stem 8 ahead of the valve until spring 31 no longer acts on cable pulley 29, thereby establishing a valve stem position corresponding to the handle position. Valve 6 and cylinder 5 (and the attached surface) continue to move until valve spool neutral is reached, at which time the closed switch is opened, and the motor 23 ceases to actuate pump 21.

At such times as the motor 23 is energized the solenoid valve 19a is open allowing fluid flow through the return conduit 20. With the motor 23 de-energized the valve 19a is closed thereby arresting fluid flow through the return conduit. Under certain conditions the spool 8a functions, in cooperation with the check valve 22, to provide a hydraulic lock in the actuator 4. This hydraulic lock occurs at such times as the actuator 4 is moved slightly, as a result of pivotal movement of the flap 1, which movement in turn causes the spool 8a to move slightly from its neutral position in its housing. Accordingly the above hydraulic lock acts to maintain the flap 1 in a substantially desired position regardless of air loads acting on the flap.

The action of the valve 6 provides very accurate positioning for the flap 1 and the connections described cause the flap 1 position to accurately coincide with the position to which the handle 26 is moved by the pilot.

Thus it is seen that the pilot may place the control handle 26 in any position desired; the flap 1 automatically assuming its correct relative position without further attention.

While a preferred embodiment of the present invention has been shown and described in connection with a landing flap associated with an airplane, it will be clear to those skilled in the art that it may be utilized to actuate any of the control surfaces of an airplane that are relatively occasionally utilized. Also the invention may be utilized to move any surface or structure not necessarily associated with an airplane, to a predetermined position in accordance with the pre-positioning of the control unit.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and therefore claimed in any of its forms or modifications within the legitimate and valid scope of the appended claims.

What is claimed is:

1. In an airplane having a control surface, a device for moving said control surface to a predetermined position comprising: a hydraulic actuator comprising a servo valve and a cylinder mounted to move said surface, said valve having a neutral position in which no fluid flows to said actuator to effect movement of said control surface, a source of hydraulic fluid, conduits providing supply and return lines between said source and said actuator, a pump in said supply line adapted to supply fluid at super-atmospheric pressure, a check valve in said supply line positioned between said pump and said servo valve, a motor for driving said pump, a manual control element mounted for rotary movement, said control element and control surface having rest positions at such time as said valve is in said neutral position, said control element and control surface having predetermined corresponding positions with respect to each other when in said rest positions, cable means connected between said control element and said servo valve for actuating said servo valve in response to movements of said control element, and electrical switch means operated by relative movement of said servo valve and said cylinder whereby said motor is energized when said control element and control surface are not in said rest positions and is de-energized when said element and surface are in said rest positions.

2. Apparatus for effecting predetermined angular movements of a structure, comprising: a primary structure; a secondary structure pivotally mounted on said primary structure; a unitary hydraulic actuator, comprising a servo valve, piston cylinder, piston, and housing, attached to said primary and secondary structures and being adapted to angularly move the latter structure; a source of hydraulic fluid; hydraulic supply and return lines extending between said source and actuator; a pump in said supply line; a motor for driving said pump; said valve having a neutral position and non-neutral positions with respect to said housing in which fluid does not flow and fluid flows, respectively, to said piston cylinder to effect movement of said secondary structure; the mounting of said actuator providing follow up means whereby said valve is returned from said non-neutral positions to said neutral position by movement of said secondary structure; electrical switch means operatively connected with said motor and being responsive to positions of said valve so that said motor is de-energized or energized when said valve is in said neutral or non-neutral positions, respectively; a control element pivotally mounted on said primary structure; and cable means connected between said control element and valve whereby the latter may be moved from its neutral position.

3. Apparatus as set forth in claim 2; in which the said follow up means is further characterized by said piston being pivotally attached to said primary structure and said housing being pivotally attached to said secondary structure at a position spaced from the pivotal axis of said secondary structure with respect to said primary structure.

4. Apparatus as set forth in claim 2: further characterized in that said secondary structure automatically assumes a predetermined angular position according to the angular position of said control element.

5. Apparatus as set forth in claim 2: further characterized in that said valve allows each end of said piston cylinder to be subjected to fluid at super-atmospheric pressure at such time as said valve is in said neutral position; a check valve in said supply line between said pump and said servo valve; said check valve permitting unidirectional flow to said actuator; an electrically operated valve in said return line being opened or closed in accordance with energization or deenergization, respectively, of said motor; said servo, check, and electrically operated valves cooperating to provide a hydraulic lock in said piston cylinder at such times as said housing is moved, with respect to said servo valve, due to pivotal movement of said secondary structure with respect to said primary structure.

6. Apparatus for effecting predetermined angular movements of a structure, comprising: a primary structure; a secondary structure pivotally mounted on said primary structure; a unitary hydraulic actuator, comprising a servo valve, piston cylinder, piston, and housing, attached to said primary and secondary structures and being adapted to angularly move the latter structure; a source of hydraulic fluid; hydraulic supply and return lines extending between said source and actuator; a pump in said supply line; a motor for driving said pump; said valve having a neutral position and non-neutral positions with respect to said housing in which fluid does not flow and fluid flows, respectively, to said piston cylinder to effect movement of said secondary structure; the mounting of said actuator providing follow-up means whereby said valve is returned from said non-neutral positions to said neutral position by movement of said secondary structure; electrical switch means operatively connected with said motor and being responsive to positions of said valve so that said motor is de-energized or energized when said valve is in said neutral or non-neutral positions, respectively; a control element, including a pair of follow-up drive members, pivotally mounted on said primary structure for movement through an angular range; and cable means transmitting movements of said control element and drive members to said servo valve causing said secondary structure to assume a different predetermined angular position with respect to said primary structure for each angular position of said control element throughout said angular range.

References Cited in the file of this patent

UNITED STATES PATENTS

| | | |
|---|---|---|
| 2,120,495 | Harris | June 14, 1938 |
| 2,132,325 | Soldatti | Oct. 4, 1938 |
| 2,387,307 | Stone | Oct. 23, 1945 |
| 2,395,671 | Kleinhans et al. | Feb. 26, 1946 |
| 2,596,242 | Hill | May 13, 1952 |